United States Patent Office

3,428,458
Patented Feb. 18, 1969

---

3,428,458
MICROBIOLOGICAL DECONTAMINATION OF AFLATOXIN-CONTAMINATED EDIBLES
Alex Ciegler and Eivind B. Lillehoj, Peoria, Ill., assignors to the United States of America as represented by the Secretary of Agriculture
No Drawing. Filed July 1, 1966, Ser. No. 563,339
U.S. Cl. 99—2                                    2 Claims
Int. Cl. A23k 1/00

A nonexclusive, irrevocable, royalty-free license in the invention herein described, throughout the world for all purposes of the United States Government, with the power to grant sublicenses for such purposes, is hereby granted to the Government of the United States of America.

The invention relates to a microbiological process for eliminating naturally occurring levels of aflatoxins from aflatoxin-contaminated human food materials and animal feeds. More particularly, this invention pertains to a process wherein viable cells of the microorganism, *Flavobacterium aurantiacum* NRRL B–184, uniquely have been found to destroy, inactivate, phagotize, or in some other manner irreversibly remove aflatoxins from contaminated human edibles such as vegetable oil, peanuts, cereal grains, and milk, and from cottonseed meal and similar meals used in turkey, duck, and trout hatcheries and as feed meals for dairy stock. In another aspect, this invention also relates to the discovery of an inherently nonfluorescing solid culture medium whose employment makes it possible after the intimate incorporation of aflatoxin to readily screen large numbers of microorganisms for aflatoxin-destroying capabilities by detection under U.V. light of nonfluorescing zones of inhibition where the test organism has caused dissappearance of the aflatoxin.

The aflatoxins constitute a group of apparently carcinogenic mycotoxins formed by the growth of certain Aspergilli on exposed moist cereal grains, peanuts, cottonseed, and related agricultural materials commonly used as foods or in animal feeds.

Widespread losses of newly hatched turkeys and ducks at certain hatcheries led to the discovery of the aflatoxins and their highly lethal acute hepatotoxic effects on the livers of day-old ducks and turkeys. Recently the aflatoxins have also been found to have specific carcinogenic effects on the livers of rats, trout, ducks, etc. It is also known that substantially unchanged aflatoxins are excreted in milk. While no human cancers have so far been directly traced to the aflatoxins, the evidence in other species has resulted in FDA's setting a strict zero tolerance even in products whose direct use as animal feeds may only secondarily involve human consumption, e.g., via milk or in faintly contaminated tissues such as beef, poultry and eggs.

Although it has been reported that aflatoxin extracts are detoxified by chlorine gas or hypochlorite and that the aflatoxins are removed from cottonseed meal by aqueous solutions of such organic solvents as acetone and hexane, the solvents also remove oleaginous nutrients. Furthermore, the solvents could not be used for detoxifying milk.

A principal object of our invention is a process for detoxifying aflatoxin-contaminated human foodstuffs and animal feed materials without affecting their taste and flavor or their nutritive and esthetic values by subjecting the aflatoxin-containing material to the destroying or scavenging action of a completely nonpathogenic organism whose presence should be no more objectionable than that of the organisms found in the cheeses, buttermilk, sour cream, etc. Another object is a microbiological process for inactivating, destroying, or removing aflatoxins present on and within food materials including animal feed components and lipid-containing human edibles without loss of the lipid components. Another object is the discovery of a nonfluorescing plate-forming culture medium having special utility in the screening of microorganisms for aflatoxin-destroying characteristics. Other objects and advantages of our invention will appear hereinafter or will be readily apparent to those skilled in the art.

In accordance with the principal object of our invention we have discovered that of about 1000 different microorganisms investigated including a diversity of yeasts, molds, actinomycetes, algae, and bacteria, only cells of the bacterium provisionally identified and deposited as *Flavobacterium aurantiacum* NRRL B–184 produces nonfluorescing zones of inhibition on specially formulated agar plates containing known incorporations of aflatoxin and that a variety of aflatoxin-contaminated food materials are wholly freed of even more than naturally-occurring levels of aflatoxin by several hours of exposure to living cells of *F. aurantiacum* NRRL B–184, the value of the detoxification not being diminished or encumbered by the formation of related and only slightly less toxic derivatives, as shown not only by the absence of fluorescence under U.V. light but especially by the histologically verified absence of aflatoxin-induced bile duct hyperplasia in the livers of 8-day old duckling fed a ration that had been detoxified in accordance with the invention.

Inasmuch as we promptly found that conventional agar plate media fluoresced intensely under U.V. light and were therefore unsuited for exhibiting zonal inhibition of added aflatoxin, we developed a modified Czapex-Dox medium having the following composition per 1000 ml. that per se exhibited no fluorescence prior to the addition (to the hot solution) of 1 ml. of chloroform containing 0.25 mg. aflatoxin $B_1$.

|  | G. |
|---|---|
| Sucrose | 30.0 |
| $NaNO_3$ | 3.0 |
| $K_2HPO_4$ | 1.0 |
| $MgSO_4$ | 0.5 |
| KCl | 0.5 |
| $FeSO_4$ | 0.01 |
| "Bacto-Yeast Extract" | 0.05 |
| Agar | 20.0 |
| Distilled water q.s. ad 1000.0 ml. | |

TLC quantitation (method of DeIongh et al., Biochem. Biophys. Acta 65:548 (1962)) of the substantial detoxification by *F. aurantiacum* of a liquid system that was expected in view of the Petri dish evidences of zonal inhibition was obtained upon incubating $2 \times 10^{13}$ resting viable cells of *F. aurantiacum* NRRL B–184 for about 44 hours at 200 shakes per minute and at 28° C. in 300-ml. Erlenmeyer flasks containing 50 ml. of a modification of Haynes' et al. TGY broth (Appl. Microbiol. 3:361 (1955)), the modified broth having the following composition per 1000 ml.:

|  | G. |
|---|---|
| "Bacto-tryptone" | 2.5 |
| "Bacto-Yeast Extract" | 2.5 |
| Glucose | 10.0 |
| $K_2HPO_4$ | 1.0 |
| Tapwater q.s. ad 1000.0 ml. | | to which flasks of inoculated medium also had been added 1 ml. of chloroform containing 0.5 mg. or 1.0 mg. of either aflatoxin $B_1$ or $G_1$. Incubation of the same number of viable cells with 1 mg. of aflatoxin in water for only 3–4 hours completely removed the toxin. Although almost quantitative recovery of the removed aflatoxin is possible by elution or by sonicating such *F. aurantiacum* cells as had been killed prior to their use as a detoxifying agent, no recovery whatever of aflatoxin is obtained by similarly treating the recovered cells that were viable when introduced into the contaminated substrate. Thus, it appears that destruction or irreversible rather than reversible binding of aflatoxin occurs only with living (viable) cells of *F. aurantiacum* NRRL B–184. Furthermore, in addition to avoiding any possibility of an equilibrium effect, the living cells inhibit almost half again as much aflatoxin as their autoclaved counterparts.

As we have already indicated, the most important aspect of our invention is a process for completely eliminating the aflatoxins from therewith contaminated foods and animal feed materials comprising exposing the contaminated material for some hours to contact with a sufficient number of viable cells of the nonpathogenic and completely harmless bacterial organism *F. aurantiacum* NRRL B–184. Our process, which is illustrated in the following examples, is an especially valuable contribution in view of the aflatoxin zero tolerance as a carcinogen that now results without analysis and even merely on suspicion in the seizure, and destruction of presumably contaminated human edibles and animal feed meals or components thereof. Since *F. aurantiacum* NRRL B–184 is nonpathogenic, the intact cells per se are unobjectionable in materials that may be employed in the feeding of livestock, poultry, etc. On the other hand, where the cells might possibly be objected to on purely philosophical grounds, as in foods for human consumption, they are readily destroyed by pasteurization or sonication.

EXAMPLE 1

To 50 ml. of commercially obtained Grade A homogenized milk that had been measured into a 500-ml. Erlenmeyer flask, we added 5 ml. of distilled water containing 600 $\mu$g. of aflatogin $B_1$. Simple agitation of the flask provided a slightly diluted milk solution containing 10.9 $\mu$g. of aflatoxin $B_1$ per milliliter. To the deliberately contaminated milk we then added 5 ml. of distilled water containing $2 \times 10^{13}$ cells of *F. aurantiacum* NRRL B–184 very recently centrifuged from a 48-hour fermentation in standard malt-yeast extract medium, again agitating the milk to uniformly distribute the bacterial cells.

For assay purposes, respective aliquots of the treated milk were removed just following the bacterial addition, another after 1 hour, and the third after still another hour. Comparisons of $R_f$ values and spot intensities from known concentrations of aflatoxin $B_1$ by thin-layer chromatography on silica gel of the pooled chloroform extracts of the sonified sample and development in 97:3 chloroform: methanol showed that 400 $\mu$g. of the 600$\mu$ of introduced $B_1$ was destroyed within no more than a few moments. The aliquot taken after 1 hour of incubation at 28° C. showed that the treated milk contained a total of under 0.5 nanogram of residual aflatoxin $B_1$, and no aflatoxin whatever was detected in the sample from 2 hours of exposure to the bacterial cells.

EXAMPLE 2

Example 1 was repeated with the exceptions that 50 ml. of food grade cottonseed oil was substituted for the milk and the addition of aflatoxin $B_1$ was 700 $\mu$g. instead of 600 $\mu$g. TLC assays showed that the cells immediately destroyed 200 $\mu$g. (about 29%) of the aflatoxin; that they inactivated a total of 400 $\mu$g. within 1 hour; that by 2 hours only less than 0.5 nanogram remained, and that no aflatoxin could be detected after 3 hours of exposure to the said bacterial cells.

EXAMPLE 3

Example 2 was repeated with the exceptions that a commercial peanut butter was substituted for the milk and that the incorporations of the aflatoxin and of the bacterial cells were accomplished by hand mixing using a mortar and pestle. Assays showed that the bacterial cells immediately removed or destroyed 100 $\mu$g. of the aflatoxin; that only 400 $\mu$g. remained after 1 hour; that a total of 200 $\mu$g. remained at 2 hours; that by 3 hours not quite 1 $\mu$g. remained, and that none was detectable at 4 hours.

EXAMPLE 4

This example was designed to simulate the natural occurrence of aflatoxin contamination in an animal feed material and the effective decontamination thereof.

Fifty grams of undiseased cracked whole soybeans in a 500-ml. Erlenmeyer flask were moistened with 10 ml. of water, and the mouth of the flask plugged with cotton. The flask was autoclaved at 121° C. for 30 minutes and when cool the sterilized beans were inoculated with a heavy suspension of spores of *Aspergillus flavus*. After incubation at 28° C. for 7 days, the flask was autoclaved to kill the mold. The contaminated soybeans were vacuum dried at 60° C. for 16 hours, and ground to a meal in a Wiley mill. By TLC analysis of a chloroform extract of a 2.5 gram sample, it was found that each gram of the soybeans contained 6 $\mu$g. of aflatoxin $B_1$ and the same amount of aflatoxin $G_1$.

A 2.5 gram sample of the contaminated soybeans was mixed with 22.5 grams of uncontaminated soybeans, and to the mixture was added 5 ml. of 0.9 NaCl solution containing $1 \times 10^{13}$ viable cells of *F. aurantiacum*. After 16 hours of incubation at 28° C. the incubated mixture was extracted with 400-ml. chloroform, the extract filtered through glass wool, the filtrate evaporated to 10 ml., and the concentrate assayed for aflatoxin by the previously described TLC method. No residual aflatoxin was detected.

EXAMPLE 5

Example 4 was modified to the extent that cracked corn kernels were substituted for the soybeans. The contaminated corn was found by TLC to contain 30 $\mu$g. of aflatoxin $B_1$ and 13 $\mu$g. of aflatoxin $G_1$ per gram, all of which was destroyed by incubation overnight with $10^{13}$ cells of *F. aurantiacum*.

EXAMPLE 6

To biologically confirm the removal or destruction of aflatoxins by *F. aurantiacum*, $8 \times 10^{12}$ viable cells of *F. aurantiacum* were added to 80 ml. of buffered very faintly acidic solution containing 600 $\mu$g. of aflatoxin $B_1$, and the mixture was incubated at 28° C. for 12 hours. A parallel handling with aflatoxin $G_1$ was also performed. After chemically verifying the total inactivations of the aflatoxins, the inactivated samples along with samples of the aflatoxins themselves and a separate sample of the cells were sent to the Wisconsin Alumni Research Foundation which on a fee basis conducts the duckling bioassays based on the absence or the development of bile duct hyperplasia upon autopsying 8-day ducklings that were fed the suspected material 1 week prior. The impartial data reported to us is presented below in Table I.

TABLE I

| Material fed to 1-day ducklings | Total aflatoxin content in $\mu$g. per duckling | Bile duck hyperplasia on autopsy on 8th day |
|---|---|---|
| Aflatoxin $B_1$ | 8.0 | + |
| Aflatoxin plus *F. aurant.* cells | (¹) | − |
| Aflatoxin $G_1$ | 7.0 | + |
| Aflatoxin $G_1$ plus *F. aurant.* cells | (²) | − |
| Aq. dispersion of *F. aurant.* cells | 0 | (³) |

¹ (None) if not deactivated, the 7.5 ml. would have contained a total of 52.5 $\mu$g. aflatoxin $B_1$.
² (None) if not deactivated, the 7.5 ml. would have contained a total of 30.0 $\mu$g. of aflatoxin $G_1$.
³ Nontoxic control.

We claim:
1. A process for rendering aflatoxin-contaminated human foodstuffs and animal feed materials acceptable for use by completely destroying or inactivating the aflatoxin present therein, said process comprising mixing into the contaminated food material a sufficient amount of an aqueous type vehicle containing viable cells of the organism *Flavobacterium aurantiacum* NRRL B-184 to provide on the order of $2 \times 10^{13}$ of said cells for every 50 grams of the aflatoxin contaminated material, the aqueous type vehicle being one that will not kill the said viable cells:

permitting the cells to remain in contact with the food material at room temperature for at least about 4 hours to completely destroy the aflatoxin present therein.

2. The process of claim 1 wherein the detoxified material is freed of the *F. aurantiacum* cells by sonification, autoclaving, or centrifugation.

References Cited

Economic Botany, vol. 22, No. 1, pages 57–62, January–March 1968.

ALVIN E. TANENHOLTZ, *Primary Examiner.*

U.S. Cl. X.R.

99—1; 195—2, 100, 103.5